Nov. 3, 1964  W. C. CADWELL ETAL  3,154,958
TRACK ROLLER WITH A REPLACEABLE RIM
Filed Aug. 6, 1962  2 Sheets-Sheet 1
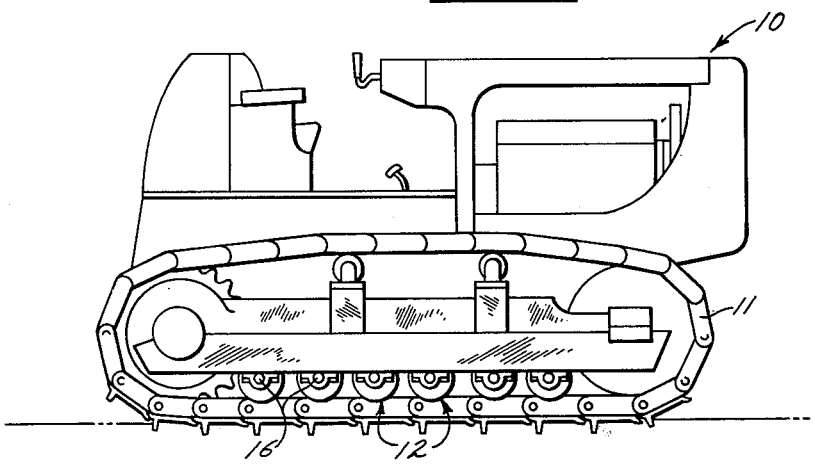
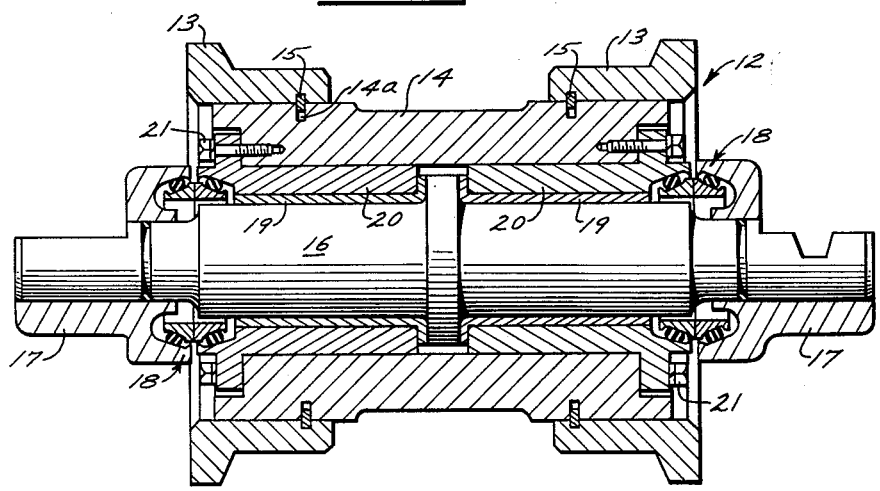
INVENTORS
WILFRED C. CADWELL
RAYMON A. OBERLANDER
BY DALE J. WRIGHT
ATTORNEYS

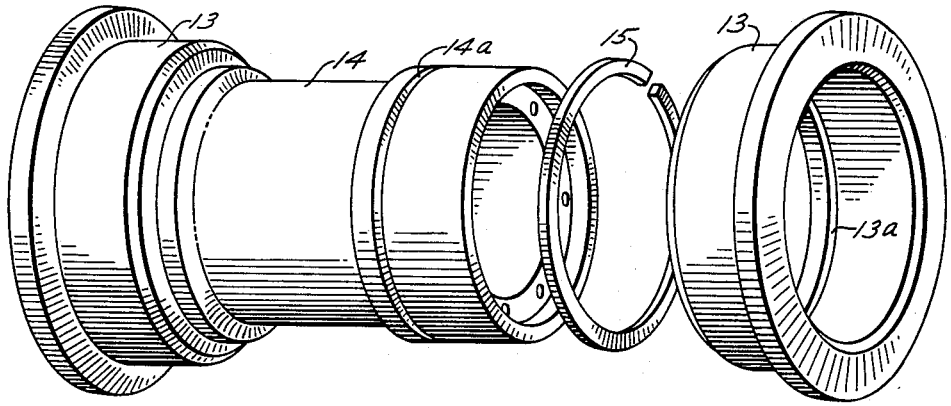
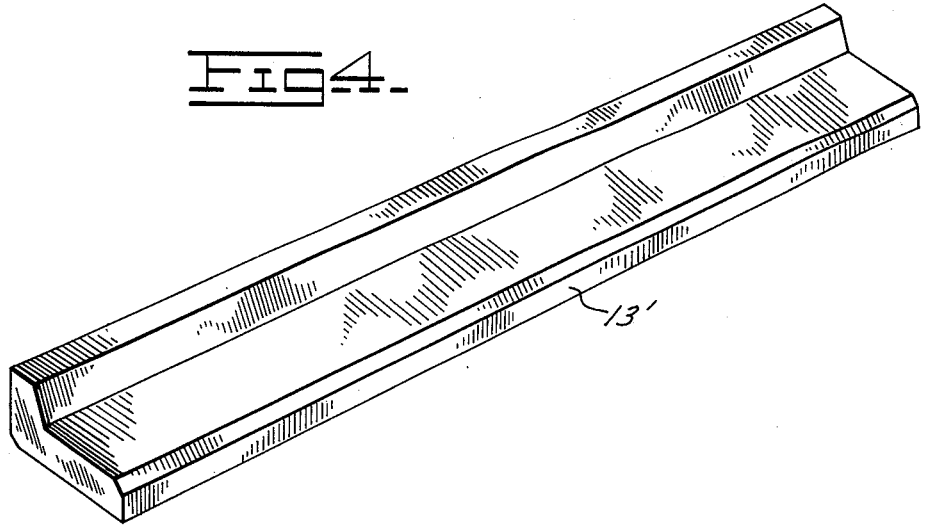

United States Patent Office 3,154,958
Patented Nov. 3, 1964

3,154,958
TRACK ROLLER WITH A REPLACEABLE RIM
Wilfred C. Cadwell, Washington, Raymon A. Oberlander, Morton, and Dale J. Wright, Peoria, Ill., assignors to Caterpillar Tractor Co., Peoria, Ill., a corporation of California
Filed Aug. 6, 1962, Ser. No. 214,909
4 Claims. (Cl. 74—230.3)

This invention relates to a track roller with a replaceable rim and more particularly relates to a track roller having one or more track engaging rims which may be expeditiously replaced without causing injury to other elements of the track roller.

The employment of endless track type vehicles for various earth moving operations has provided a need for durable track rollers. Such rollers are subjected to a considerable amount of wear and oftentimes must be either replaced or the worn areas of the rims thereof repaired by suitable welding techniques. The former procedure proves costly while the latter produces considerable heat, resulting in damage to the roller contained bearings and seals. Furthermore, operational uses of conventional track rollers has tended to deform the end portions of the rollers and rims thereof into a bellmouth shape to cause bearing and seal failures.

This invention has overcome many of the above-mentioned difficulties by providing an efficient and durable track roller comprising one or more replaceable rims which may be expeditiously replaced without causing damage to the other interrelated elements of the track roller. In accordance therewith, a suitably hardened steel cylindrical hub is mounted in the track roller and one or more suitably hardened steel rims are press fitted thereon. A split ring retainer is arranged between the hub and rim to prevent relative axial movement therebetween.

An object of this invention is to provide a track roller which is durable in construction and efficient in operation.

Another object of this invention is to provide a track roller comprising one or more rims constructed and arranged so that they may be expeditiously replaced without causing damage to interrelated elements of the track roller.

A further object of this invention is to provide a durably constructed and arranged track roller which is not susceptible to bellmouthing at the ends thereof.

These and other objects of this invention will become apparent from the following description taken in connection with the accompanying drawings wherein:

FIG. 1 is a side elevational view of an endless track type vehicle employing the novel track roller concepts of this invention;

FIG. 2 is an enlarged cross-sectional view through a single track roller more particularly illustrating novel concepts of this invention;

FIG. 3 is an exploded view of a portion of the track roller shown in FIG. 2, as it would appear in partially assembled form; and FIG. 4 discloses a straight bar stock which may be used to form the rims used in the track rollers shown in FIGS. 1–3.

FIG. 1 illustrates an endless track type vehicle 10 adapted to actuate endless tracks 11 in a conventional manner. A plurality of track rollers 12 are mounted on the vehicle and arranged to roll on the tracks. As more clearly shown in FIG. 2, the track rollers comprise laterally spaced cylindrical endless track engaging rims or wheels 13 pressfitted onto a cylindrical hub 14. Split expansion rings 15 are arranged to prevent relative axial movement therebetween.

Each track roller is rigidly mounted on the truck frame of the tractor by a stationary shaft 16 to permit rolling of the track rollers over the engaging endless track. The ends of the shaft are partially encapsulated by caps or end collars 17 which also attach to the frame of the vehicle. Sealing arrangements 18 are provided to prevent contamination of the interrelated working elements of the track roller. A two-part bearing 19 is suitably secured to the shaft, such as in press fit relationship therewith. The bearing rotatably mounts a two-part bushing 20 thereon which is in turn secured to the hub 14 by bolts 21.

FIG. 3 discloses an exploded view of a partially assembled track roller comprising the operatively attached rim, hub and split retaining ring. The rim 13 preferably comprises a high strength steel constituent such as SAE 4150 which may be formed by suitable welding techniques into its cylindrical configuration from the straight bar stock form 13' shown in FIG. 4. The rim is then preferably through-hardened to a Rockwell hardness of from C50 to C56.

Thereafter, the rim is heated to a suitable temperature to expand the internal diameter thereof preferably within the range of from 0.002 to 0.004 of an inch over the diameter of the outer cylindrical mating surface portions of the hub. The rim is then positioned on the hub so that the split ring retaining groove 13a thereof overlies the matching groove 14a of the hub. The split ring which is theretofore compressed by suitable means in groove 14a, functions to expand to the position shown in FIG. 2. The hub also preferably comprises a through-hardened high strength steel constituent, such as SAE 4140, preferably having a Rockwell hardness in the range of from C40 to C45. Thus, the preferable range of Rockwell hardness for the rim and hub is from C40 to C56.

The suitably hardened hub and rim are constructed and arranged so that the diameters of the mating surface portions thereof are firmly secured together for efficient track roller operation due to a careful control of the inside diameter of the preformed rims to .007 to .010 of an inch less than the outside diameter of the mating surface portions of the preformed hub. The hub is preferably constructed and arranged to comprise a wall thickness which is approximately twice that of the wall thickness of bearing 20, as well as rim 13. Also, the hardened nature of rims 13 and hub 14 wherein all stresses are preferably in equilibrium therein cooperates with the latter arrangement to aid in the prevention of bellmouthing or deformation at the outer end portions of the rim members during vehicle operation to thus prevent a lowering of track roller efficiency. Deflection of shaft 16 and a responsive damage to seals 18 and bearing 19 is also prevented. The fact that rims 13 are not joined in a conventional unitary manner further aids in this latter function.

Due to the above-described track roller construction and arrangement, the rims thereof may be expeditiously replaced without causing damage to the sealing means 18 and bearing 19. Such a replacement procedure may be commenced by sawing or otherwise suitably removing the rims 13 from the track roller and thereafter replacing the same with new rims in the manner above described. Heretofore, track roller rims would be normally repaired by conventional welding techniques or the like. The heat resulting from such techniques oftentimes causes damage to the seals and bearings. The above-described invention has provided that two or more rim changes may be made before maintenance of the bearings or seals of the track roller is necessitated.

We claim:
1. A track roller comprising a shaft, a hardened steel cylindrical hub member mounted for rotation about said shaft, at least one hardened steel cylindrical rim member mounted on said hub member in press fit relationship therewith, a retaining groove formed on said hub member arranged to overlie a matching groove formed on said rim member and split ring retaining means arranged in said grooves between said hub member and said rim member for preventing relative axial movement therebetween.

2. A track roller comprising a shaft adapted to have the ends thereof secured to the frame of an endless track-type vehicle, cylindrical bearing means mounted on said shaft, a cylindrical bushing mounted for rotation on said bearing means, a cylindrical hub mounted on said bushing and secured thereto, spaced cylindrical rims mounted in press fit relationship on the end portions of said hub, said hub comprising a wall thickness which is approximately twice as great as the wall thickness of said bushing and split ring retaining means arranged in two pairs of laterally spaced matching grooves formed on said hub and rim members for preventing relative axial movement therebetween.

3. The invention of claim 2 wherein said hub and rims comprise a hardened steel constituent having a Rockwell hardness of from 40 to 56.

4. The invention of claim 3 wherein said rims have a preformed inside diameter which is .007 to .010 of an inch less than the outside diameter of the end portions of said hub.

References Cited in the file of this patent

UNITED STATES PATENTS

| | | |
|---|---|---|
| 2,080,744 | Rogers | May 18, 1937 |
| 2,963,397 | Baker | Nov. 2, 1954 |